United States Patent
Hsieh et al.

(10) Patent No.: US 10,277,995 B2
(45) Date of Patent: Apr. 30, 2019

(54) BONE CONDUCTION HEARING AID DEVICE AND BONE CONDUCTION SPEAKER

(71) Applicant: Winbond Electronics Corp., Taichung (TW)

(72) Inventors: Ming-Hung Hsieh, Taichung (TW); Yu-Hsuan Ho, Taichung (TW); Ming-Chih Tsai, Taichung (TW); Yen-Jui Chu, Taichung (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 15/821,857

(22) Filed: Nov. 24, 2017

(65) Prior Publication Data
US 2018/0234779 A1    Aug. 16, 2018

(30) Foreign Application Priority Data
Feb. 10, 2017    (CN) .......................... 2017 1 0072951

(51) Int. Cl.
*H04R 25/00*    (2006.01)
*B33Y 80/00*    (2015.01)

(52) U.S. Cl.
CPC ............ *H04R 25/606* (2013.01); *B33Y 80/00* (2014.12); *H04R 25/65* (2013.01); *H04R 25/658* (2013.01);
(Continued)

(58) Field of Classification Search
CPC .... H04R 25/606; H04R 25/65; H04R 25/658; H04R 2225/77; H04R 2460/13; B33Y 80/00
(Continued)

(56) References Cited

U.S. PATENT DOCUMENTS

| 2012/0128739 A1 | 5/2012 | Nygaard et al. |
| 2015/0063616 A1 | 3/2015 | Westerkull |
| 2016/0192050 A1* | 6/2016 | Masaki .............. A61B 5/6803 455/569.1 |

FOREIGN PATENT DOCUMENTS

| CN | 1154515 | 6/2004 |
| CN | 103416077 | 11/2013 |

(Continued)

OTHER PUBLICATIONS

"Office Action of Taiwan Counterpart Application", dated Oct. 26, 2018, p. 1-10.
(Continued)

*Primary Examiner* — Phylesha Dabney
(74) *Attorney, Agent, or Firm* — JCIPRNET

(57) ABSTRACT

A bone-conduction hearing aid device is provided. The bone-conduction hearing aid device is suitable for being attached to a body surface and includes a substrate, an input transducer, an amplifier, and a bone-conduction speaker. The substrate is composed of a plurality of stacking layers stacked on top of one another. A material of the substrate includes cellulose nanofiber. The substrate is formed by 3D printing technique so that a contact surface of the substrate is tightly attached with the body surface. The input transducer is disposed on the substrate and configured to receive a sound signal and convert the sound signal into an electric signal. The amplifier is disposed on the substrate and coupled to the input transducer to amplify the electric signal into an amplified electric signal. The bone-conduction speaker is disposed on the substrate and coupled to the amplifier to convert the amplified electric signal into a vibration signal.

12 Claims, 2 Drawing Sheets

(52) U.S. Cl.
CPC ...... *H04R 2225/77* (2013.01); *H04R 2460/13* (2013.01)

(58) Field of Classification Search
USPC ........................................................ 381/324
See application file for complete search history.

(56) References Cited

FOREIGN PATENT DOCUMENTS

| | | |
|---|---|---|
| CN | 103974183 | 8/2014 |
| CN | 204598317 | 8/2015 |
| CN | 106366615 | 2/2017 |
| TW | 200948162 | 11/2009 |
| TW | 201215174 | 4/2012 |
| TW | 201630434 | 8/2016 |
| TW | 201633411 | 9/2016 |

OTHER PUBLICATIONS

"Office Action of Taiwan Counterpart Application", dated Feb. 22, 2018, p. 1-6, in which the listed references were cited.

\* cited by examiner

BONE CONDUCTION HEARING AID DEVICE AND BONE CONDUCTION SPEAKER

CROSS-REFERENCE TO RELATED APPLICATION

This application claims the priority benefit of China application serial no. 201710072951.3, filed on Feb. 10, 2017. The entirety of the above-mentioned patent application is hereby incorporated by reference herein and made a part of this specification.

TECHNICAL FIELD

The disclosure relates to a hearing aid device and a speaker device. More particularly, the disclosure relates to a bone-conduction hearing aid device and a bone-conduction speaker.

DESCRIPTION OF RELATED ART

In the society, as population ages, more and more elderly people have encountered problems such as hearing loss or hearing impairment, leading to declining capabilities to recognize natural speech. Generally, hearing aids are used by hearing impaired people to improve hearing capabilities. Conventional hearing aids use the method of controlling band energy gains to compensate the hearing impaired people for hearing-impaired band energy. Meanwhile, the technique of dynamic range compression for spectral energy is also adopted to prevent over-amplifying signal that causes discomfort or injury to the auditory nerve. Most of the general hearing aids act as sound pressure level voice amplifiers that transmit sound through the vibration of air. Recently, a type of bone conduction hearing aid device is developed by the industry which is able to transmit sound signal through the vibration of bones without being affected by external sound.

The voice amplifier part of the bone-conduction hearing aid device is required to be compressed on a portion of the skull for the bone-conduction hearing aid device to work, and thereby, the bone-conduction hearing aid device has to be tightly attached behind the ears. Nevertheless, existing bone-conduction hearing aid devices have larger sizes and thicker overall thickness, leading to discomfort when a user wears the device. Moreover, irregular shape of the skull behind the user's ears also prevents the bone-conduction hearing aid device from being tightly attached to the user. Therefore, how to enable the bone-conduction hearing aid device to be tightly attached to the user's skin and at the same time to bring comfort to the user when wearing the bone-conduction hearing aid device have become an important issue in the industry.

SUMMARY

The disclosure provides a bone-conduction hearing aid device and a bone-conduction speaker with a reduced overall thickness and thus may be attached to a body surface of a user more tightly and brings the user a more comfortable using experience.

In embodiment of the disclosure, a bone-conduction hearing aid device is suitable for being attached to a body surface and includes a substrate, an input transducer, an amplifier, and a bone-conduction speaker. The substrate is composed of a plurality of stacking layers stacked on top of one another. A material of the substrate includes cellulose nanofiber. The substrate is printed and formed by 3D printing technique so that a contact surface of the substrate is tightly attached with the body surface. The input transducer is disposed on the substrate and configured to receive a sound signal and convert the sound signal into an electric signal. The amplifier is disposed on the substrate and coupled to the input transducer to amplify the electric signal into an amplified electric signal. The bone-conduction speaker is disposed on the substrate and coupled to the amplifier to convert the amplified electric signal into a vibration signal.

In an embodiment of the disclosure, the bone-conduction speaker is suitable for being disposed on a body surface and includes a substrate, a magnetic inductive coil, and a vibration element. The substrate is composed of a plurality of stacking layers stacked on top of one another. A material of the substrate includes cellulose nanofiber. The substrate is printed and formed by 3D printing technique so that a contact surface of the substrate is tightly attached with the body surface. The magnetic inductive coil is disposed on the substrate to generate a time-varying magnetic field according to an electric signal. The vibration element is connected to the magnetic inductive coil and vibrates according to the time-varying magnetic field. The substrate is disposed between the vibration element and the body surface.

In an embodiment of the disclosure, a maximum thickness of the substrate ranges from 10 μm to 100 μm.

In an embodiment of the disclosure, the bone-conduction speaker further includes the magnetic inductive coil and the vibration element. The magnetic inductive coil is configured to generate the time-varying magnetic field according to an amplified electric signal. The vibration element is connected to the magnetic inductive coil and vibrates according to the time-varying magnetic field. The substrate is disposed between the vibration element and the body surface.

In an embodiment of the disclosure, the contact surface is a flat surface to conform to a flat surface contour of the body surface.

In an embodiment of the disclosure, the contact surface is a curved surface to conform to a curved surface contour of the body surface.

In an embodiment of the disclosure, the bone-conduction hearing aid device and the bone-conduction speaker further include an adhesion layer disposed on the contact surface to attach the substrate to the body surface.

In an embodiment of the disclosure, the input transducer, the amplifier, and the bone-conduction speaker are printed and formed by 3D printing technique.

In an embodiment of the disclosure, the input transducer and the vibration element are formed by 3D printing technique.

In view of the foregoing, in the embodiments of the disclosure, the bone-conduction speaker and at least the substrate of the bone-conduction hearing aid device using the bone-conduction speaker are formed by 3D printing technique. As such, the substrate and the other elements are more strongly attached to one another. Moreover, the substrate and the contact surface in contact with the user may be designed according to the curved contour of the body surface S1 of the user and printed and formed accordingly. Thereby, in the embodiments of the disclosure, the contact surface of the substrate may be tightly attached with the body surface of the user. Furthermore, the thickness of the substrate formed by 3D printing technique may be effectively reduced as well. Therefore, the substrate of the bone-conduction speaker and the bone-conduction hearing aid device formed by 3D printing technique may be attached to a body surface of a user more tightly and brings the user a more comfortable using experience.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
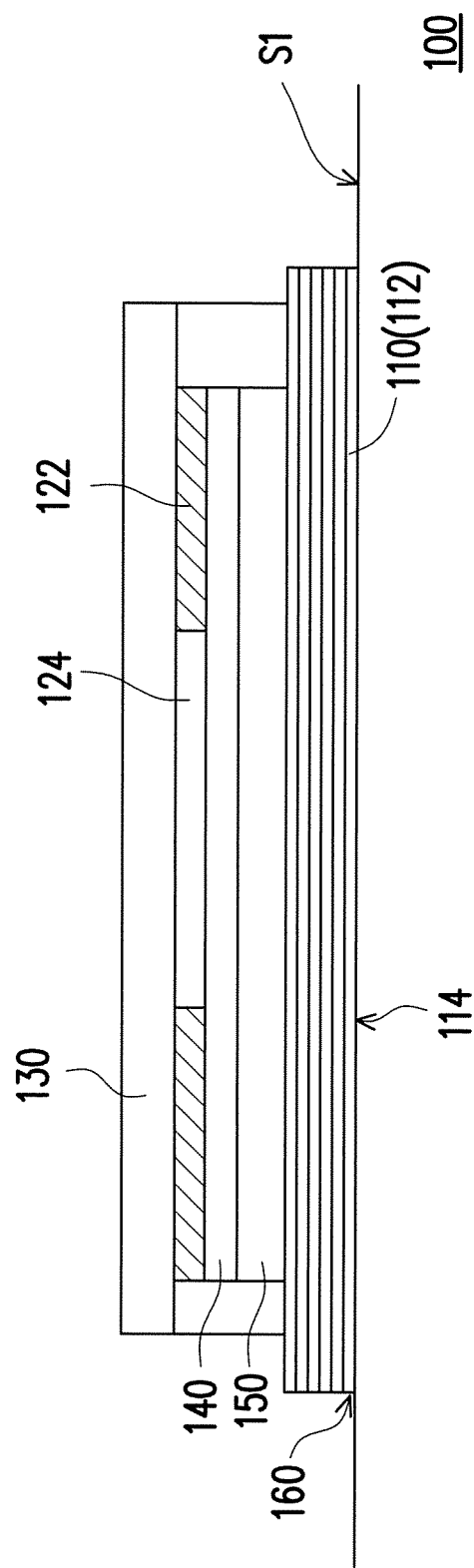
FIG. 1 is a schematic cross-sectional view of a bone-conduction speaker according to an embodiment of the disclosure.

It should be understood that the foregoing and other detailed descriptions, features, and effects are intended to be described more comprehensively by providing embodiments accompanied with drawings hereinafter. In the following embodiments, wording used to indicate directions, such as "up," "down," "front," "back," "left," and "right," merely refers to directions in the accompanying drawings. Therefore, the directional wording is used to illustrate rather than limit the disclosure. Moreover, the same or similar reference numerals represent the same or similar elements in the following embodiments.

Figure 2:
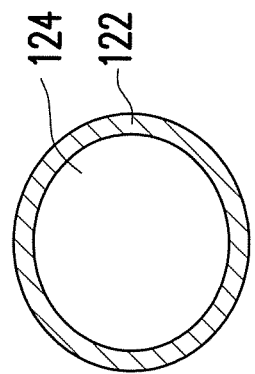
FIG. 2 is a schematic top view of a magnetic inductive coil surrounds a magnetic element according to an embodiment of the disclosure.

FIG. 1 is a schematic cross-sectional view of a bone-conduction speaker according to an embodiment of the disclosure. FIG. 2 is a schematic top view of a magnetic inductive coil surrounds a magnetic element according to an embodiment of the disclosure. Referring to FIG. 1 and FIG. 2, a bone-conduction speaker 100 provided by the embodiment may be attached to a body surface S1 of a user as shown in FIG. 1. The body surface S1 may be a surface of the skin of the user, which may substantially be a flat surface and may also be an irregular curved surface. The embodiment is not limited thereto. In the embodiment, the bone-conduction speaker 100 includes a substrate 110, a magnetic inductive coil 122, and a vibration element 130. The magnetic inductive coil 122 is disposed on the substrate 110 and surrounds a magnetic element 124 as shown in FIG. 2 to generate a time-varying magnetic field according to an electric signal. As shown in FIG. 1, the substrate 110 is composed of a plurality of stacking layers 112 stacked on top of one another. A material of the substrate 110 includes cellulose nanofiber. The substrate 110 is printed and formed by 3D printing technique so that a contact surface 114 of the substrate 110 is tightly attached with the body surface S1. Specifically, in the embodiment, the substrate 110 of the bone-conduction speaker 100 may be printed by using a 3D printing device according to a digital 3D model of the substrate 110.

For instance, the digital 3D model may be a digital 3D image file may be built by means of, for example, computer-aided design (CAD) or animation modeling software. The digital 3D model is sliced into a plurality of cross sections for the 3D printing device to read. As such, a building material is dispensed on a printing platform of the 3D printing device in a layer-by-layer manner according to the cross sections of the digital 3D model, so as to form the stacking layers 112. The stacking layers 112 are stacked on top of one another to form the substrate 110 as shown in FIG. 2.

Furthermore, in the embodiment, the entire bone-conduction speaker 100 (including the substrate 110, the magnetic inductive coil 122, the magnetic element 124, and the vibration element 130) may be printed and formed by 3D printing technique, so as to enhance the bonding strength between the elements of the bone-conduction speaker 100. The 3D printing technique provided by the embodiment may include stereo-lithography, fused filament fabrication (FFP), melted and extrusion modeling, electron beam modeling, or other suitable 3D printing techniques. The disclosure is not limited thereto.

In the embodiment, at least the substrate 110 in the bone-conduction speaker 100 is formed by 3D printing technique. As such, the substrate 110 and the contact surface 114 in contact with the user may be designed according to a curvature of the body surface S1 of the user and printed and formed accordingly. For example, if the body surface S1 of the user is a flat surface, the contact surface 114 of the substrate 110 may be designed accordingly and printed as a flat surface conforming to a flat surface contour of the body surface S1 of the user. Similarly, if the body surface S1 of the user is a curved surface, the contact surface 114 of the substrate 110 may be designed accordingly and printed as a curved surface conforming to a curved surface contour of the body surface S1 of the user. Therefore, in the embodiment, the contact surface 114 of the substrate 110 may be tightly attached with the body surface S1 of the user. Moreover, the substrate 110 with an extremely thin thickness may be printed by the 3D printing device according to actual product requirement. In other words, a thickness of the substrate 110 formed by 3D printing technique may be effectively reduced. In the embodiment, a maximum thickness of the substrate 110 ranges approximately from 10 μm to 100 μm. Thereby, as the substrate 110 formed by 3D printing technique effectively enables the bone-conduction speaker 100 to fit the contour of the body surface more properly, the user is thus able to obtain a more comfortable using experience.

In addition, in the embodiment, a material of the substrate 110 may include cellulose nanofiber (CNF), a fiber material made by decomposing plant fiber with a diameter of merely 3 nm to 4 nm. CNF is light and is equipped with strong structural strength; in other words, CNF is both ductile and strong. Generally, CNF weights merely one-fifth of iron; nevertheless, CNF has a strength more than five times that of iron. Thereby, the substrate 110 printed with CNF not only has strong structural strength but also has lighter weight and that is suitable for being attached to the body surface S1 of the user without falling off easily or causing discomfort to the user. In the embodiment, the bone-conduction speaker 100 may further include an adhesion layer 160 disposed on the contact surface 114 of the substrate 110 to attach the substrate 110 to the body surface S1.

With such an arrangement, when a current passes through the magnetic inductive coil 122, the magnetic inductive coil 122 generates the time-varying magnetic field accordingly. The vibration element 130 may be a vibrating thin film connected to the magnetic inductive coil 122 to vibrate according to the time-varying magnetic field. The substrate 110 is disposed between the vibration element 130 and the body surface S1 to transmit vibrations generated by the vibration element 130 to the body surface S1. As such, the bone-conduction speaker 100 may convert a sound signal into a vibration signal. The vibration signal is then conducted to the cochleae through the skull of the user. Specifically, the bone-conduction speaker 100 may further include an insulation layer 140 and a silicone base 150 disposed between the vibration element 130 and the substrate 110. Furthermore, the magnetic inductive coil 122 is disposed on the insulation layer 140, and the silicon base 150 is sandwiched between the insulation layer 140 and the substrate 110 to collectively transmit vibrations to the body surface S1.

Figure 3:
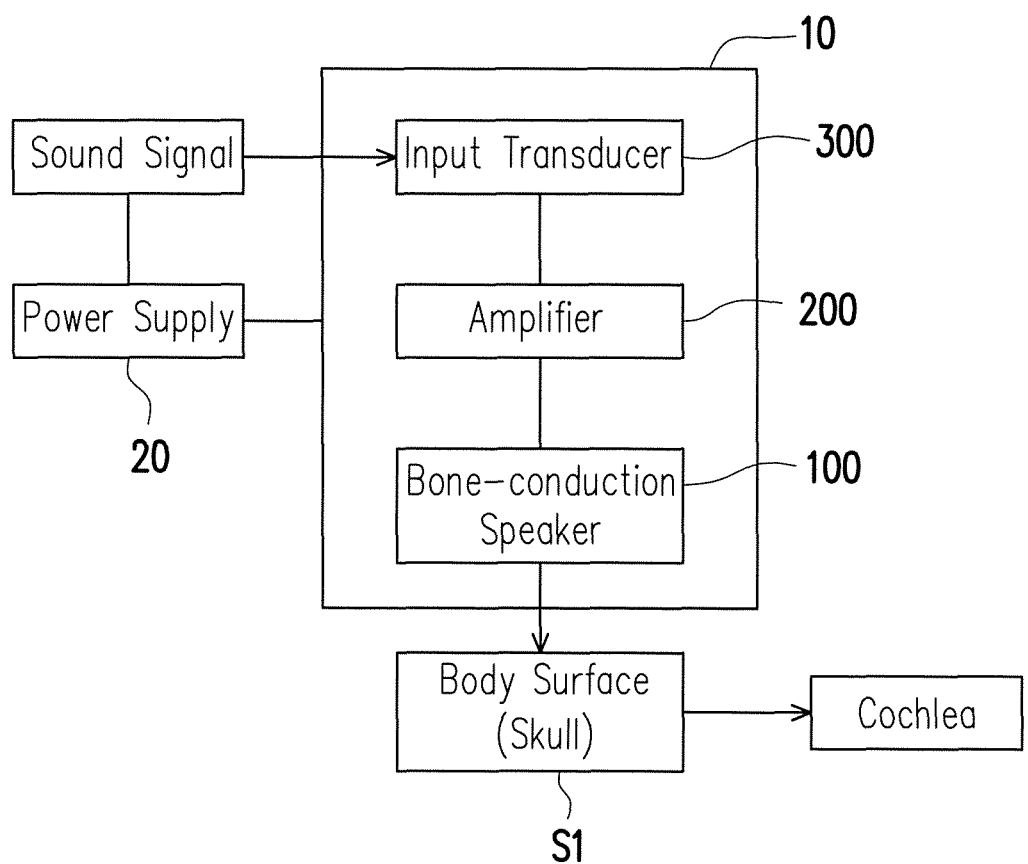
FIG. 3 is a schematic block view of a bone-conduction hearing aid device according to an embodiment of the disclosure.

FIG. 3 is a schematic block view of a bone-conduction hearing aid device according to an embodiment of the disclosure. The bone-conduction speaker 100 may be applied to a bone-conduction hearing aid device (e.g., a bone-conduction hearing aid device 10 as shown in FIG. 3). Thereby, the reference numerals and a part of the contents in the previous embodiment are used in the bone-conduction hearing aid device 10 provided by the embodiment, in which identical reference numerals indicate identical or similar components, and repeated description of the same technical contents is omitted. Please refer to the descriptions of the previous embodiment for the omitted contents, which will not be repeated hereinafter.

Referring to FIG. 1 and FIG. 3, in the embodiment, the bone-conduction hearing aid device 10 includes the substrate 110 as shown in FIG. 1, an input transducer 300, an amplifier 200, and the bone-conduction speaker 100 as shown in FIG. 1. The input transducer 300 is disposed on the substrate 110 as shown in FIG. 2. The input transducer 300 is configured to receive a sound signal as shown in FIG. 1 and convert the sound signal into an electric signal. The amplifier 200 is also disposed on the substrate 110 and coupled to the input transducer 300 to amplify the electric signal into an amplified electric signal. Moreover, the bone-conduction speaker 100, as shown in FIG. 1, is disposed on the substrate 110 and coupled to the amplifier 200 to convert the amplified electric signal into a vibration signal and transmit the vibration signal to the body surface S1 of the user. In the embodiment, the body surface S1 of the user may be, for example, the skull behind the user's ears. As such, the bone-conduction hearing aid device 10 may convert the sound signal into the vibration signal. The vibration signal is then conducted to the cochleae through the skull of the user. In addition, the bone-conduction hearing aid device 10 may be coupled to a power source 20 as shown in FIG. 1. The power source 20 may be a battery module to provide currents to the bone-conduction hearing aid device 10.

The substrate 110 provided by the embodiment is also printed and formed by 3D printing technique. Thereby, the substrate 110 includes the stacking layers 112 stacked on top of one another as well. Moreover, the material of the substrate 110 includes CNF, such that the contact surface 114 of the substrate 110 may be tightly attached with the body surface S1. Furthermore, in the embodiment, the entire bone-conduction hearing aid device 10 (including the substrate 110, the input transducer 300, the amplifier 200, and the bone-conduction speaker 100) may be printed and formed by 3D printing technique such that the elements of the bone-conduction hearing aid device 10 are more strongly attached to one another. Similar to the previous embodiments, the bone-conduction hearing aid device 10 may also include the adhesion layer 160 disposed on the contact surface 114 of the substrate 110 to tightly attach the substrate 110 to the body surface S1.

To sum up, in the embodiments of the disclosure, the bone-conduction speaker and at least the substrate of the bone-conduction hearing aid device using the bone-conduction speaker are formed by 3D printing technique. As such, the substrate and other elements are more strongly attached to one another. Moreover, the bone-conduction speaker and the bone-conduction hearing aid device using the same may be attached to the skull behind the user's ears. Thereby, the vibration signal generated by the bone-conduction speaker may be conducted to the cochleae through the skull of the user. The substrate formed by 3D printing technique may be designed according to the contour of the body surface of the user and printed and formed accordingly. Thereby, in the embodiments of the disclosure, the substrate and the contact surface in contact with the user may be tightly attached to the body surface of the user. Furthermore, the thickness of the substrate formed by 3D printing technique may be effectively reduced as well. Therefore, the substrate of the bone-conduction speaker and the bone-conduction hearing aid device formed by 3D printing technique may be attached to a body surface of a user more tightly and bring the user a more comfortable using experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A bone-conduction hearing aid device, configured for being attached to a body surface, the bone-conduction hearing aid device comprising:
   a substrate, comprising a plurality of stacking layers stacked on top of one another, a material of the substrate comprising cellulose nanofiber, the substrate being printed and formed by 3D printing technique so that a contact surface of the substrate is tightly attached to the body surface;
   an input transducer, disposed on the substrate and configured to receive a sound signal and convert the sound signal into an electric signal;
   an amplifier, disposed on the substrate and coupled to the input transducer to amplify the electric signal into an amplified electric signal; and
   a bone-conduction speaker, disposed on the substrate and coupled to the amplifier to convert the amplified electric signal into a vibration signal.

2. The bone-conduction hearing aid device as claimed in claim 1, wherein a maximum thickness of the substrate ranges from 10 μm to 100 μm.

3. The bone-conduction hearing aid device as claimed in claim 1, wherein the bone-conduction speaker further comprises:
   a magnetic inductive coil, configured to generate a time-varying magnetic field according to the amplified electric signal; and
   a vibration element, connected to the magnetic inductive coil to vibrate according to the time-varying magnetic field, wherein the substrate is disposed between the vibration element and the body surface.

4. The bone-conduction hearing aid device as claimed in claim 1, wherein the contact surface is a flat surface to conform to a flat-surface contour of the body surface.

5. The bone-conduction hearing aid device as claimed in claim 1, wherein the contact surface is a curved surface to conform to a curved-surface contour of the body surface.

6. The bone-conduction hearing aid device as claimed in claim 1, further comprising an adhesion layer, disposed on the contact surface to attach the substrate to the body surface.

7. The bone-conduction hearing aid device as claimed in claim 1, wherein the input transducer, the amplifier, and the bone-conduction speaker are printed and formed by 3D printing technique.

8. A bone-conduction speaker, configured for being disposed on a body surface and comprising:
   a substrate, comprising a plurality of stacking layers stacked on top of one another, a material of the substrate comprising cellulose nanofiber, the substrate being printed and formed by 3D printing technique so that a contact surface of the substrate is tightly attached with the body surface;
   a magnetic inductive coil, disposed on the substrate to generate a time-varying magnetic field according to an electric signal; and
   a vibration element, connected to the magnetic inductive coil to vibrate according to the time-varying magnetic field, wherein the substrate is disposed between the vibration element and the body surface.

9. The bone-conduction speaker as claimed in claim 8, wherein a maximum thickness of the substrate ranges from 10 μm to 100 μm.

10. The bone-conduction speaker as claimed in claim 8, wherein the contact surface is a curved surface to conform to a curved-surface contour of the body surface.

11. The bone-conduction speaker as claimed in claim 8, further comprising an adhesion layer, disposed on the contact surface to attach the substrate to the body surface.

12. The bone-conduction speaker as claimed in claim 8, wherein the magnetic inductive coil and the vibration element are formed by 3D printing technique.

\* \* \* \* \*